(12) United States Patent
Sakai

(10) Patent No.: US 7,995,468 B2
(45) Date of Patent: Aug. 9, 2011

(54) COMMUNICATION APPARATUS AND CONTROL METHOD THEREOF

(75) Inventor: Tatsuhiko Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 156 days.

(21) Appl. No.: 12/546,957

(22) Filed: Aug. 25, 2009

(65) Prior Publication Data

US 2010/0054121 A1 Mar. 4, 2010

(30) Foreign Application Priority Data

Aug. 28, 2008 (JP) ................... 2008-219986

(51) Int. Cl.
*H04W 4/00* (2009.01)
(52) U.S. Cl. ........................... 370/221; 455/436
(58) Field of Classification Search .......... 455/436, 455/404, 561, 515, 552, 63, 500, 456; 370/311, 370/350, 341, 335, 332, 338, 252, 235, 342, 370/328, 349, 329
See application file for complete search history.

(56) References Cited

U.S. PATENT DOCUMENTS

| | | | |
|---|---|---|---|
| 6,208,866 B1 * | 3/2001 | Rouhollahzadeh et al. | 455/456.5 |
| 6,512,756 B1 * | 1/2003 | Mustajarvi et al. | 370/341 |
| 6,704,577 B1 * | 3/2004 | Hughes | 455/515 |
| 6,865,173 B1 * | 3/2005 | Czaja et al. | 370/342 |
| 7,209,707 B2 * | 4/2007 | Iwami et al. | 455/63.4 |
| 7,263,089 B1 * | 8/2007 | Hans et al. | 370/349 |
| 7,299,069 B2 * | 11/2007 | Claussen | 455/561 |
| 7,330,452 B2 * | 2/2008 | Shiu et al. | 370/335 |
| 7,333,441 B2 * | 2/2008 | Balletti et al. | 370/252 |
| 7,428,217 B2 * | 9/2008 | Kobayashi et al. | 370/235 |
| 7,623,863 B2 * | 11/2009 | Chen et al. | 455/436 |
| 7,668,129 B2 * | 2/2010 | Alon et al. | 370/311 |
| 7,668,268 B2 * | 2/2010 | Heiskala | 375/348 |
| 7,710,920 B2 * | 5/2010 | Petersen et al. | 370/329 |
| 7,844,698 B2 * | 11/2010 | Aoyama et al. | 709/224 |
| 7,848,782 B2 * | 12/2010 | Stern-Berkowitz et al. | 455/561 |
| 7,894,383 B2 * | 2/2011 | Ikeda et al. | 370/328 |

(Continued)

FOREIGN PATENT DOCUMENTS

EP 1492278 A2 12/2004

(Continued)

OTHER PUBLICATIONS

Wi-Fi Certified™ for Wi-Fi Protected Setup™:. Wi-Fi Alliance, 2009. Web. <http://www.wi-fi.org/files/kc/20090123_Wi-Fi_Protected_Setup.pdf>.

(Continued)

*Primary Examiner* — Thong Vu
(74) *Attorney, Agent, or Firm* — Canon USA Inc. IP Division

(57) ABSTRACT

A communication apparatus (receiving apparatus) configured to receive a communication parameter selects, when an access point itself is active as a providing apparatus or the communication apparatus detects an access point (active access point) that is communicable with an active providing apparatus, the access point as the access point to be connected using wireless connection. If the communication apparatus does not detect an active access point, the communication apparatus selects an access point (setup-completed access point) which is configured with a communication parameter that is different from the one that is set at the time of initialization, as the access point to be connected using wireless connection.

9 Claims, 9 Drawing Sheets

U.S. PATENT DOCUMENTS

| | | | |
|---|---|---|---|
| 2003/0036390 A1* | 2/2003 | Villier et al. | 455/456 |
| 2004/0029600 A1* | 2/2004 | Johnson et al. | 455/500 |
| 2005/0030935 A1* | 2/2005 | Seisenberger et al. | 370/350 |
| 2005/0130661 A1 | 6/2005 | Aerrabotu et al. | |
| 2005/0239497 A1* | 10/2005 | Bahl et al. | 455/552.1 |
| 2007/0025371 A1 | 2/2007 | Krantz et al. | |
| 2007/0293188 A1* | 12/2007 | Houghton et al. | 455/404.2 |
| 2009/0201884 A1* | 8/2009 | Chaponniere | 370/332 |
| 2009/0323634 A1* | 12/2009 | Kim et al. | 370/331 |
| 2010/0067507 A1* | 3/2010 | Park | 370/338 |

FOREIGN PATENT DOCUMENTS

EP    1887730 A1    2/2008

OTHER PUBLICATIONS

Wi-Fi Alliance. Wi-Fi Certified for Wi-Fi Protected Setup: Easing the User Experience for Home and Small Office Wi-Fi Networks. Wi-Fi Alliance, 2009. Print.

* cited by examiner

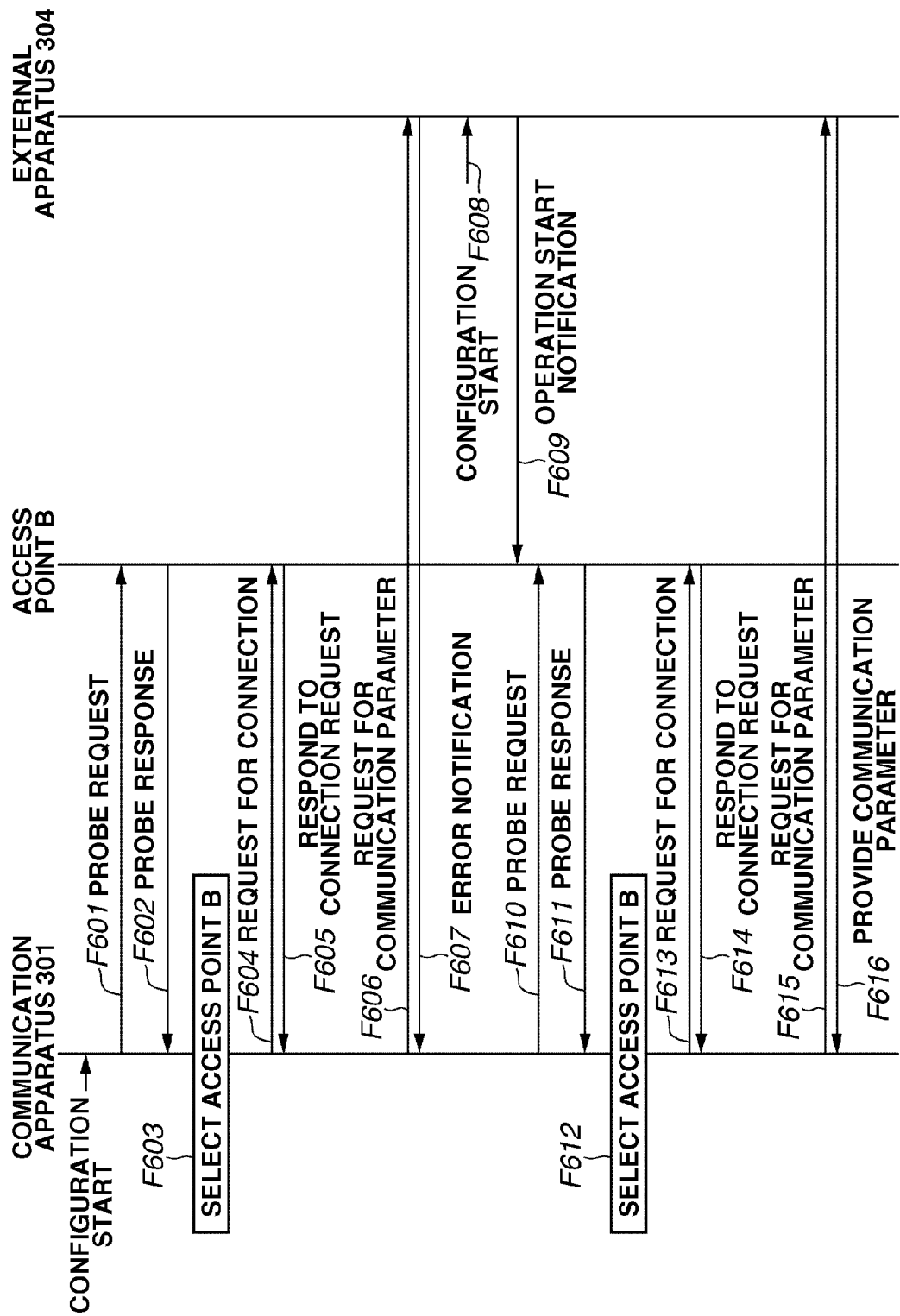

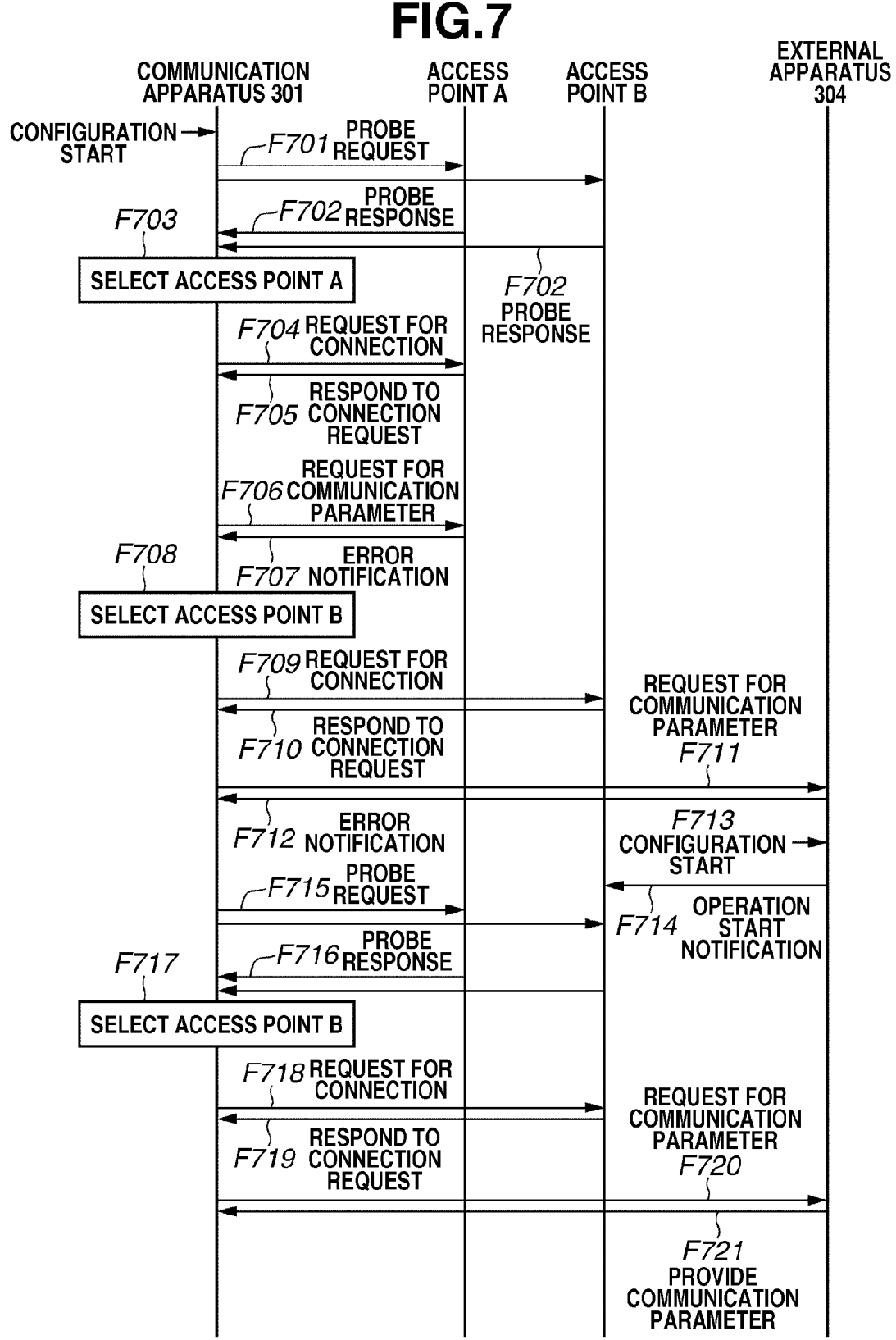

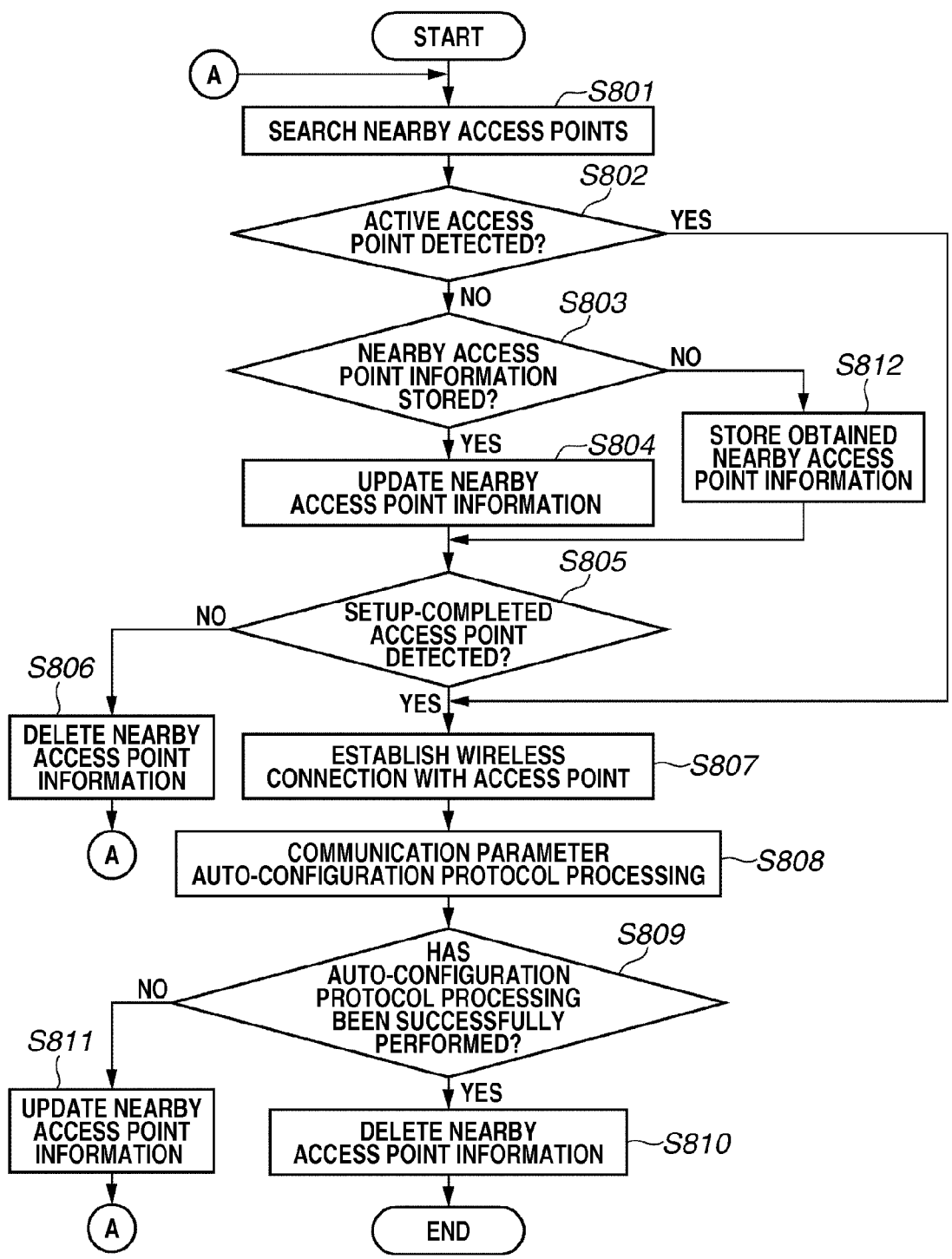

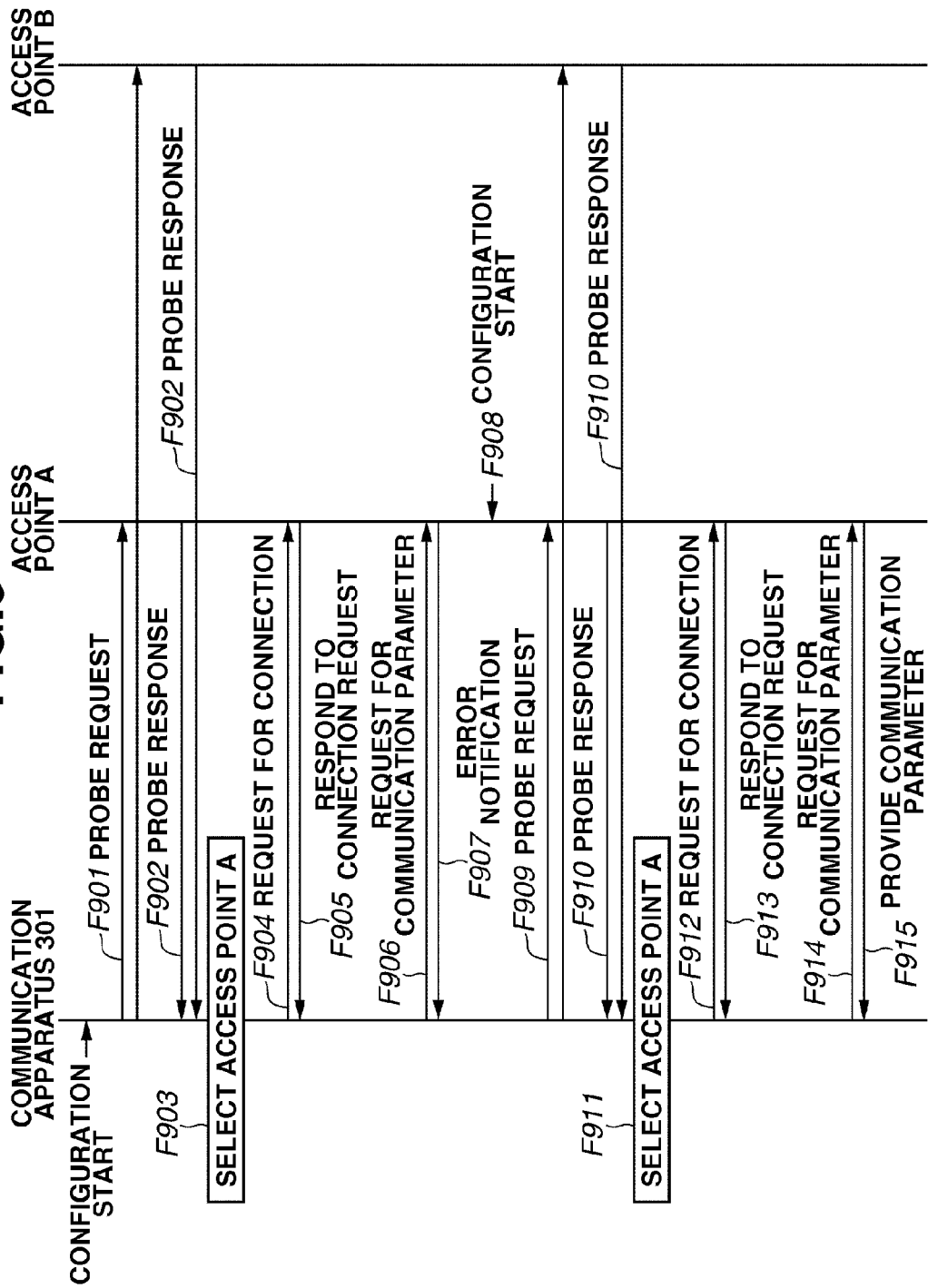

COMMUNICATION APPARATUS AND CONTROL METHOD THEREOF

BACKGROUND OF THE INVENTION

1. Field of the Invention

The present invention relates to a configuration technique of a communication parameter.

2. Description of the Related Art

In using wireless communication represented by wireless LAN (local area network) that conforms to the IEEE standards, users need to set many items in advance.

For example, the users need to set communication parameters necessary in wireless communication. The parameters include, for example, SSID (Service Set Identifier) as a network identifier, a cryptographic method, an encryption key, an authentication method, and an authentication key. It is extremely inconvenient for the users to manually set all the items.

On the other hand, Wi-Fi Protected Setup (WPS), which is an industry standard for autoconfiguration of wireless apparatuses, has been standardized. Since the WPS simplifies setting of communication parameters, it is introduced into many wireless apparatuses nowadays.

An example of autoconfiguration of the communication parameters by WPS is discussed in Wi-Fi CERTIFIED™ for Wi-Fi Protected Setup Easing the User Experience for Home and Small Office Wi-Fi® Networks (http://www.wi-fi.org/files/kc/20090123_Wi-Fi_Protected_Setup.pdf).

According to the above-described autoconfiguration, either an access point (base station) or an apparatus that can communicate with the access point serves as an apparatus that provides a communication parameter. This apparatus that provides a communication parameter is hereinafter referred to as a providing apparatus. An apparatus that receives a communication parameter is temporarily connected to an access point by wireless connection and receives a communication parameter from the providing apparatus. The apparatus that receives the communication parameter is hereinafter referred to as a receiving apparatus. According to the WPS, the providing apparatus is called a "registrar" and the receiving apparatus is called an "enrollee".

A receiving apparatus that is temporarily connected to an access point by wireless connection in order to receive a communication parameter from the providing apparatus according to the WPS will now be described.

In this case, an access point that is necessary in wireless communication between the providing apparatus and the receiving apparatus needs to be selected from among nearby access points.

However, a method for automatically selecting an access point that is necessary in wireless connection from among nearby access points is not determined by the WPS.

For example, if the receiving apparatus is randomly connected to a plurality of nearby access points, it will take a long time before the receiving apparatus is connected to the desired access point. Further, a method is possible that realizes wireless communication with an access point that is communicable with a providing apparatus that is running autoconfiguration processing according to WPS. However, since some providing apparatuses do not start the autoconfiguration processing unless the presence of the receiving apparatus is recognized, such a method is not practical.

Conventionally, an access point used for wireless connection is manually selected from nearby access points by the users and there has been a strong demand for improving the working efficiency.

SUMMARY OF THE INVENTION

The present invention is directed to providing an easier access point selection method to users when an autoconfiguration of communication parameters is executed.

According to an aspect of the present invention, communication apparatus includes a search unit configured to perform search processing for detecting a base station which can provide a first communication parameter and a base station configured with a communication parameter different from a communication parameter set at a time of initialization, a selection unit configured to select a base station which is to be connected such that the first communication parameter can be received, based on a result of the search executed by the search unit, and a reception unit configured to receive a the first communication parameter from the base station selected by the selection unit or from an external apparatus that communicates with the base station.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a sequence diagram illustrating operations of the receiving apparatus, the access point B, and an external providing apparatus according to the first exemplary embodiment of the present invention.

FIG. 7 is a sequence diagram illustrating operations of the receiving apparatus, the access point A, the access point B, and the external providing apparatus according to the first exemplary embodiment of the present invention.

FIG. 8 is a flowchart illustrating operations of a communication parameter receiving apparatus according to a second exemplary embodiment of the present invention.

FIG. 9 is a sequence diagram illustrating operations of the receiving apparatus, an access point A, and an access point B according to the second exemplary embodiment of the present invention.

DETAILED DESCRIPTION OF THE EMBODIMENTS

Various exemplary embodiments, features, and aspects of the invention will be described in detail below with reference to the drawings.

In the description below, a wireless LAN system that conforms to the IEEE 802.11 series of standards is used. However, the communication system of the present invention is not limited to such a LAN system. Further, although the communication parameter autoconfiguration processing described below is based on the WPS, the present invention can also be applied to different autoconfiguration processing.

A hardware configuration useful for a first exemplary embodiment will now be described.

Figure 1:
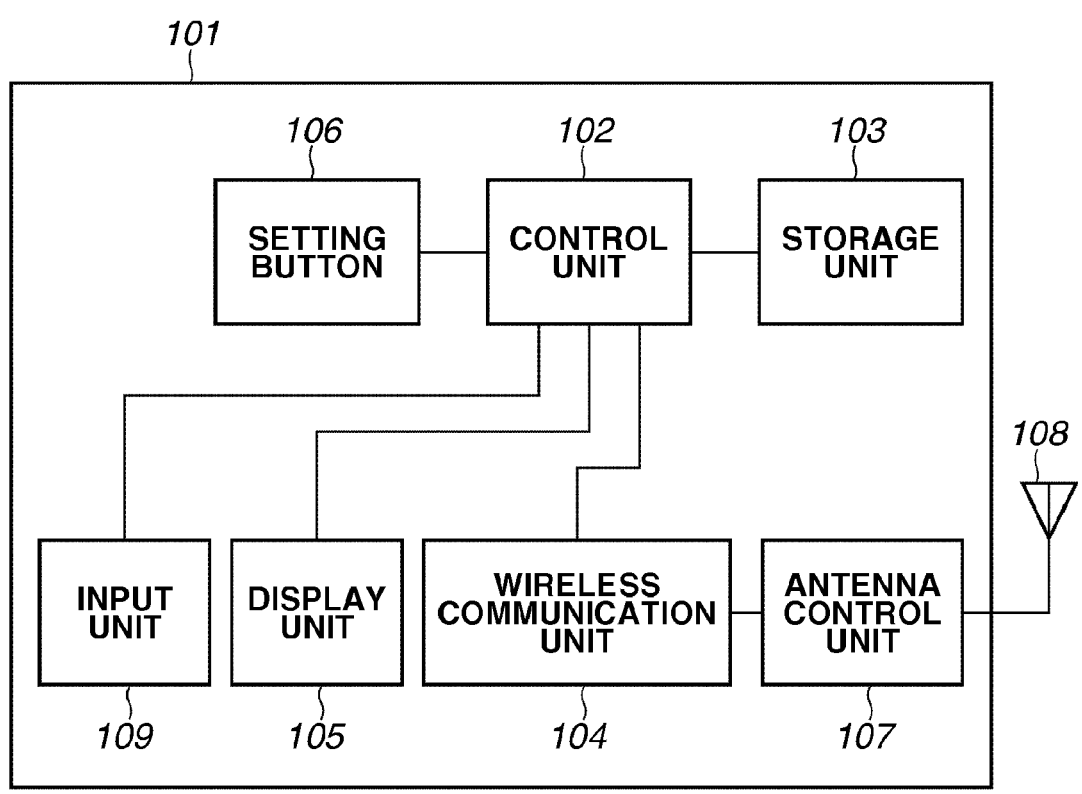
FIG. 1 is a block diagram of a wireless communication apparatus according to an exemplary embodiment of the present invention.

FIG. 1 is a block diagram illustrating an example of a configuration of a wireless communication apparatus. A wireless communication apparatus 101 represents the entire apparatus. A control unit 102 controls the whole apparatus by executing a control program stored in a storage unit 103. The control unit 102 also controls autoconfiguration of communication parameters of other apparatuses. The storage unit 103 stores a control program that is executed by the control unit 102 as well as various types of information including information about the communication parameters. Various operations, which are described below, are realized by the control unit 102 executing the control program stored in the storage unit 103.

A wireless communication unit 104 is used for wireless communication. A display unit 105 displays various types of information including visual or auditory information. The display unit 105 includes, for example, a liquid crystal display (LCD), a light-emitting diode (LED), or a speaker.

A setting button 106 triggers start of communication parameter autoconfiguration processing. When the control unit 102 detects that a user has operated the setting button 106, the processing described below starts.

An antenna control unit 107 controls an antenna 108. An input unit 109 is used when the user makes various inputs.

Figure 2:
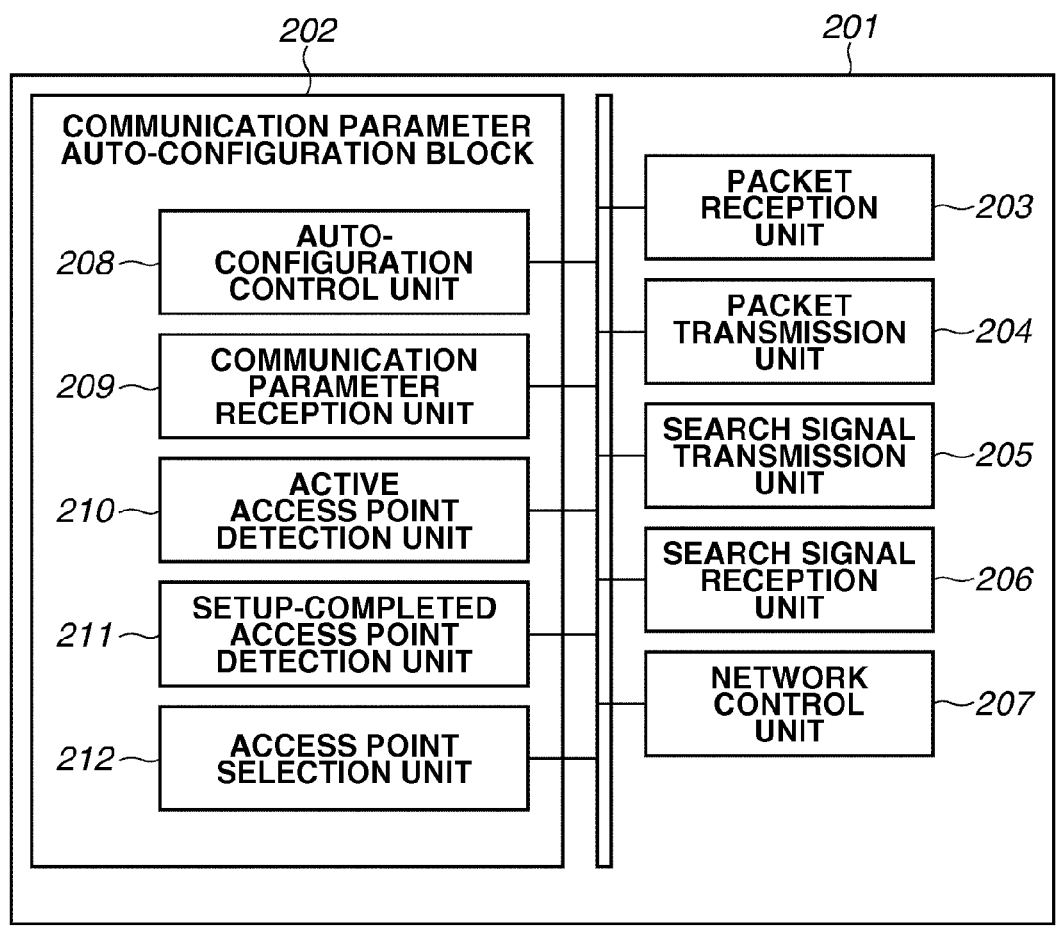
FIG. 2 is a software functional block diagram of a receiving apparatus according to an exemplary embodiment of the present invention.

FIG. 2 is a block diagram of an example configuration of a software function block executed by an apparatus (receiving apparatus) that receives a communication parameter in a communication parameter autoconfiguration operation described below.

A wireless communication apparatus 201 represents the entire apparatus. A communication parameter autoconfiguration function block 202 performs autoconfiguration of communication parameters that is necessary in wireless communication according to the present exemplary embodiment. The communication parameters include, for example, SSID as a network identifier, cryptographic method, encryption key, authentication method, or authentication key.

A packet reception unit 203 receives a packet concerning various communications. A packet transmission unit 204 transmits a packet concerning various communications.

A search signal transmission unit 205 controls transmission of an apparatus search signal such as a probe request. The probe request can be considered as a network search signal used for searching a desired network. The probe request is transmitted by the search signal transmission unit 205.

A search signal reception unit 206 controls reception of a response signal that is generated in response to an apparatus search signal, output from another apparatus. The response signal is, for example, a probe response. The probe response is received by the search signal reception unit 206. Various types of information (self information) about a transmission source apparatus are added to the probe response.

A network control unit 207 controls connection and separation of the receiving apparatus to and from network. The network control unit 207 makes wireless connection of the receiving apparatus to an access point.

An autoconfiguration control unit 208, which is in the communication parameter autoconfiguration function block 202, controls communication parameter autoconfiguration processing. The communication parameter autoconfiguration processing, which is described below, is executed based on a control by the autoconfiguration control unit 208. The autoconfiguration control unit 208 also determines whether time that elapsed from a start of the communication parameter autoconfiguration processing exceeds a time limit of the autoconfiguration processing. Further, if the autoconfiguration control unit 208 determines that the time has exceeded the time limit, the autoconfiguration control unit 208 cancels the autoconfiguration processing.

A communication parameter reception unit 209 receives a communication parameter from an apparatus (providing apparatus) that provides the communication parameter. The communication parameter reception processing is performed by the communication parameter reception unit 209 based on a control by the autoconfiguration control unit 208.

An active access point detection unit 210 detects an active access point. The active access point is an access point that is running the communication parameter autoconfiguration processing as a providing apparatus or an access point communicable with a providing apparatus that is running the communication parameter autoconfiguration processing. The providing apparatus that is running the autoconfiguration processing is hereinafter referred to as an external providing apparatus. Information about whether an access point is in a state that it can provide a communication parameter as a result of the communication parameter autoconfiguration processing (i.e., information on whether a function used for providing the communication parameter is effective) is included in the self information that is added to a probe response transmitted from the access point. The WPS provides information "Selected Registrar" as information that indicates whether the access point is in a state that can provide a communication parameter.

A probe response which is transmitted from an access point that has started the communication parameter autoconfiguration processing as a providing apparatus includes information indicating that the access point is in a state that can provide a communication parameter. An access point also adds information that it is in a state that can provide a communication parameter to a probe response if it receives a notification message (start notification) from an external providing apparatus that started the communication parameter autoconfiguration processing. By analyzing the self information in the probe response that is received by the search signal reception unit 206, the active access point detection unit 210 detects the active access point from among the nearby access points.

A setup-completed access point detection unit 211 detects an access point where a communication parameter is set which is different from the communication parameter set at the time of initialization. Such an access point is hereinafter referred to as a setup-completed access point. The communication parameter that is set at the time of initialization refers to a communication parameter that is set for the access point at the time of factory shipment. The self information that is added to the probe response transmitted from the access point includes information on whether the access point is a setup-completed access point. The WPS provides information "Wi-Fi Protected Setup State" as the information on whether a communication parameter is set that is different from the communication parameter set at the time of initialization.

The setup-completed access point detection unit 211 detects a setup-completed access point from the nearby access points by analyzing the self information in the probe response that has been received by the search signal reception unit 206.

A communication parameter set for the setup-completed access point can be a communication parameter that has been sent from an external providing apparatus that is communicable with the setup-completed access point. In other words, if a setup-completed access point exists, it means that an external providing apparatus that provided the communication parameter to the setup-completed access point may exist.

Further, some of the external providing apparatuses can start communication parameter autoconfiguration processing as providing apparatuses after they recognize that a receiving apparatus that requests reception of a communication parameter exists. If the external providing apparatus is such a type, the receiving apparatus can change the state of the external providing apparatus by making wireless connection to the setup-completed access point and notifying the external providing apparatus of its presence. When the state is changed, the external providing apparatus can start the autoconfiguration processing. As a concrete example, if the receiving apparatus sends a request for a communication parameter, then a message (e.g., an icon of the receiving apparatus) requesting the setup operation will be displayed on a display unit of the external providing apparatus. If the user starts the setup operation, the external providing apparatus starts the autoconfiguration processing.

An access point selection unit 212 selects an access point to be connected in the communication parameter autoconfiguration processing.

According to a control of the autoconfiguration control unit 208, access point selection processing is executed by the access point selection unit 212 based on a detection of the active access point detection unit 210 and the setup-completed access point detection unit 211.

Figure 3:
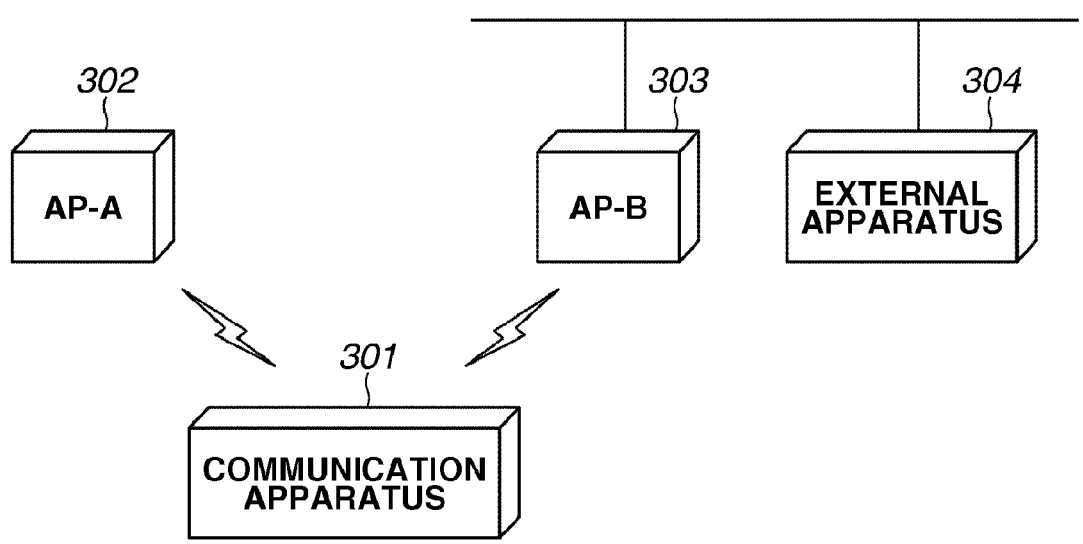
FIG. 3 is a network configuration diagram of an exemplary embodiment of the present invention.

FIG. 3 illustrates a communication apparatus 301, a first access point A302 (hereinafter referred to as an access point A), and a second access point B303 (hereinafter referred to as an access point B). Additionally, an external apparatus 304, which is connected to the access point B by wired LAN, is illustrated in FIG. 3.

The communication apparatus 301 can receive a communication parameter according to the communication parameter autoconfiguration processing. The configuration of the communication apparatus 301 is illustrated in FIGS. 1 and 2. Further, the access point A and the external apparatus 304 can provide a communication parameter according to the communication parameter autoconfiguration processing. As an external providing apparatus, the external apparatus 304 provides a communication parameter to the access point B. The communication parameter that is transmitted from the external apparatus 304 is set to the access point B. This means that the access point B is a setup-completed access point. When the external apparatus 304 recognizes the presence of a receiving apparatus that requests for a communication parameter, the external apparatus 304 can start the communication parameter autoconfiguration processing as a providing apparatus.

The access point B itself does not operate as a providing apparatus of the communication parameter, however, it relays various messages used for the communication parameter autoconfiguration between the external apparatus 304 that operates as a providing apparatus and the communication apparatus 301 that operates as a receiving apparatus. Wireless LAN channel (frequency channel) assigned to the access point A is at a lower frequency compared to that assigned to the access point B.

A case where the user operates the setting button 106 of the communication apparatus 301 so that the communication apparatus 301 can receive a communication parameter will now be described.

Figure 4:
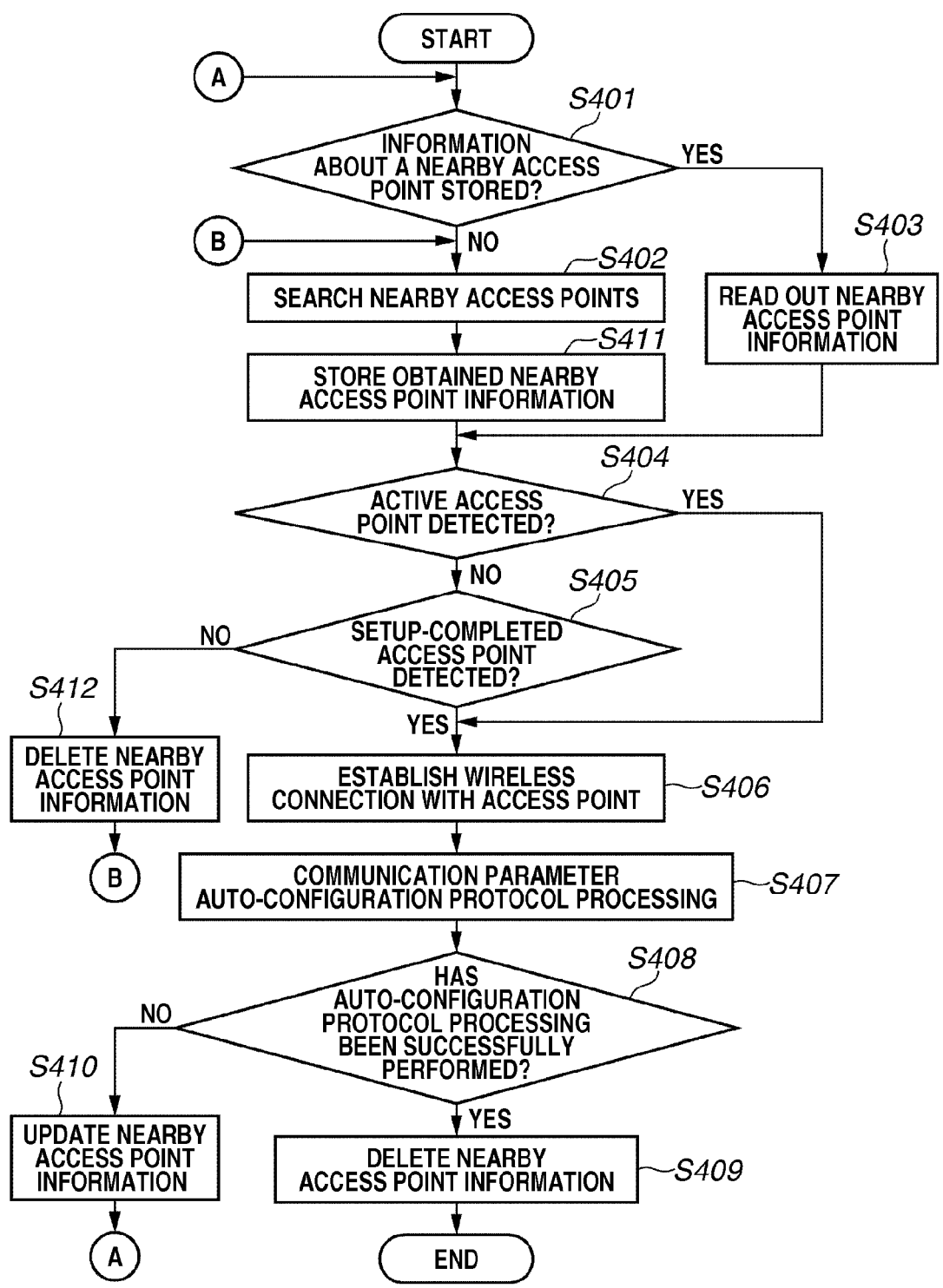
FIG. 4 is a flowchart illustrating operations of a communication parameter receiving apparatus according to a first exemplary embodiment of the present invention.

FIG. 4 is a flowchart illustrating an operation of the receiving apparatus according to the present exemplary embodiment. The process in FIG. 4 starts when the setting button 106 of the communication apparatus 301 is operated.

In step S401, the autoconfiguration control unit 208 determines whether information about the nearby access points is stored in the storage unit 103. The information about the nearby access points includes identifiers of the nearby access points and self information added to the probe response sent from each access point. Additionally, the information about the nearby access points includes information on whether the communication parameter autoconfiguration processing has been executed. As described below, the communication parameter autoconfiguration processing is executed if an error occurs during the protocol processing for the autoconfiguration of the communication parameter.

If information about the nearby access points is not stored in the storage unit 103 (NO in step S401), then the process proceeds to step S402. In step S402, the autoconfiguration control unit 208 searches for the nearby access points using the search signal transmission unit 205 and the search signal reception unit 206. More particularly, the autoconfiguration control unit 208 makes the search signal transmission unit 205 transmit a probe request and waits until the search signal reception unit 206 receives a probe response that is sent from a nearby access point. The result of the search includes at least an identifier of the nearby access point and self information that is added to the probe response sent from each access point. After the search, in step S411, the autoconfiguration control unit 208 instructs the storage unit 103 to store the result of the search obtained in step S402 as the information about the nearby access points.

In step S401, if information about the nearby access points is stored in the storage unit 103 (YES in step S401), then the process proceeds to step S403. In step S403, the autoconfiguration control unit 208 reads out the information about the nearby access points that is stored in the storage unit 103.

In steps S404 and S405, the access point selection unit 212 selects an access point to be connected based on the information obtained in step S402 or S403.

In step S404, the active access point detection unit 210 detects the active access point by analyzing the self information of each access point included in the information about the nearby access points. According to the present exemplary embodiment, the active access point detection unit 210 excludes from the detection target an access point that has already undergone the communication parameter autoconfiguration processing with the communication apparatus 301, out of the access points included in the information about the nearby access points. In this way, an access point that has once undergone the configuration processing, more specifically, an access point that has encountered an error during the protocol processing for autoconfiguration is not selected again.

If the active access point is not detected (NO in step S404), then the process proceeds to step S405. If the active access point is detected (YES in step S404), then the access point selection unit 212 selects the detected access point as the access point to be connected, and the process proceeds to step S406. If a plurality of active access points are detected, the access point selection unit 212 selects an access point to which a wireless LAN channel with the lowest frequency is assigned.

In step S405, the setup-completed access point detection unit 211 detects the setup-completed access point by analyzing the self information of each access point included in the information about the nearby access points. According to the present exemplary embodiment, the setup-completed access point detection unit 211 excludes from the detection target an access point that has already undergone the communication parameter autoconfiguration processing with the communication apparatus 301, out of the access points included in the information about the nearby access points. In this way, an access point that has once undergone the configuration processing, more specifically, a setup-completed access point that has encountered an error during the protocol processing for autoconfiguration is not selected again.

If the setup-completed access point is not detected (NO in step S405), then the process proceeds to step S412. In step S412, the autoconfiguration control unit 208 deletes the information about the nearby access points that is stored and the process returns to step S402 and searches for the nearby access points again. If the setup-completed access point is detected (YES in step S405), then the access point selection unit 212 selects the detected access point as the access point to be connected, and the process proceeds to step S406. If a plurality of setup-completed access points are detected, the access point selection unit 212 selects a setup-completed access point to which a wireless LAN channel with the lowest frequency is assigned.

In step S406, the network control unit 207 makes wireless connection to the selected access point. In step S407, after the wireless connection is made, the autoconfiguration control unit 208 executes the protocol processing for the autoconfiguration of the communication parameter. The protocol processing for the autoconfiguration is processing for transmitting/receiving various predetermined messages so that the communication parameter can be provided to the receiving apparatus from the providing apparatus. The above-described protocol processing is called "Registration Protocol" in WPS. According to the present exemplary embodiment, in order to simplify the description, a request for a communication parameter is transmitted from the receiving apparatus to the providing apparatus and a communication parameter is sent in return from the providing apparatus. Authentication between the providing apparatus that provides the communication parameter and the receiving apparatus as well as transmission/reception processing of a message concerning cryptographic processing may also be performed.

In step S408, the autoconfiguration control unit 208 determines whether the communication parameter autoconfiguration protocol processing in step S407 has been successful. If the autoconfiguration protocol processing has been successfully executed and the communication parameter reception unit 209 has successfully received the communication parameter (YES in step S408), then the process proceeds to step S409. In step S409, the autoconfiguration control unit 208 deletes the information about the nearby access points stored in the storage unit 103 and the process ends.

In step S408, if the autoconfiguration protocol processing has been unsuccessful (NO in step S408), then the process proceeds to step S410. In step S410, the autoconfiguration control unit 208 updates the information about the nearby access points so that the access point that has undergone the autoconfiguration protocol processing in step S407 can be set as a communication-parameter-autoconfiguration-processed access point. After the information is updated, the process returns to step S401.

Figure 5:
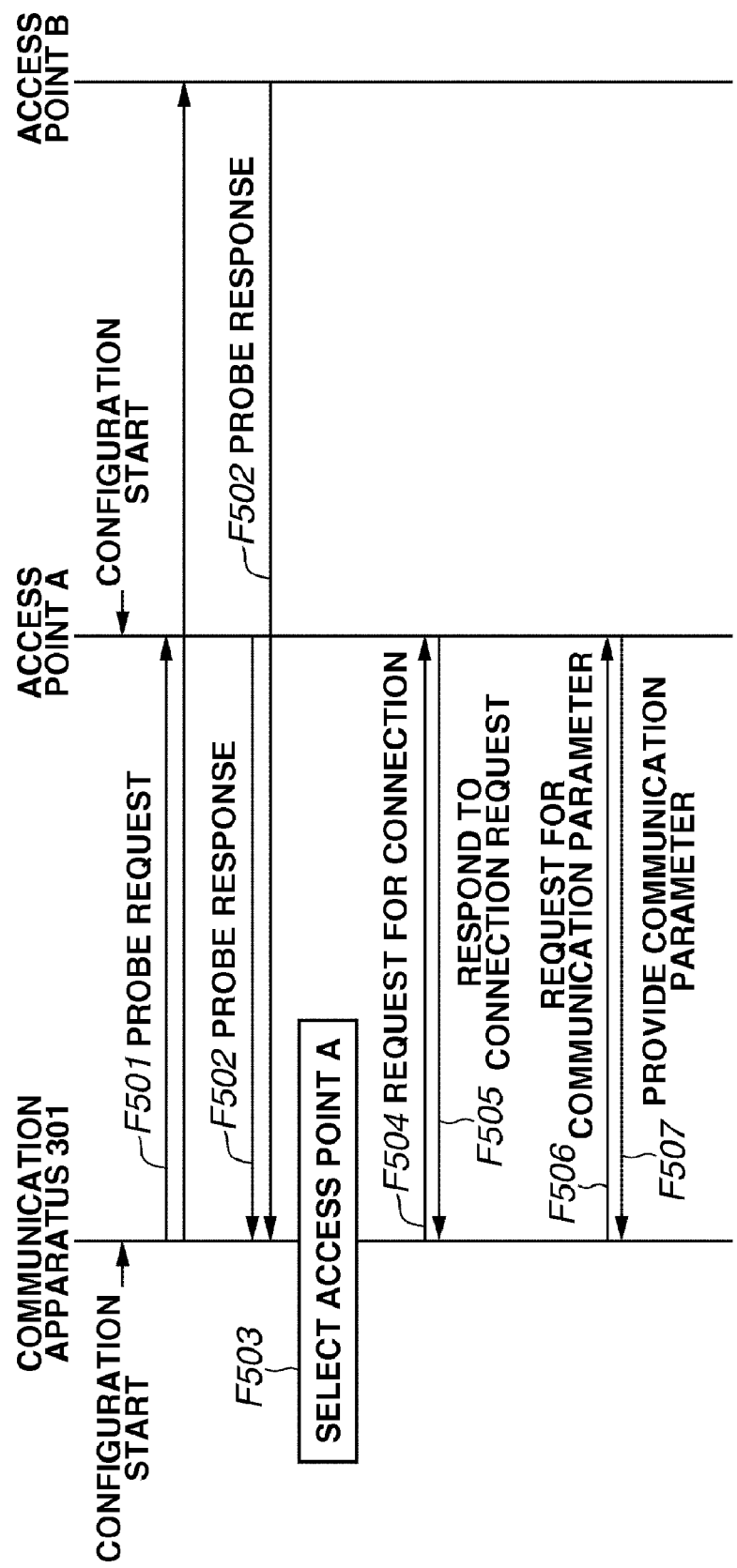
FIG. 5 is a sequence diagram illustrating operations of the receiving apparatus, an access point A, and an access point B according to the first exemplary embodiment of the present invention.

FIG. 5 illustrates an example of a process sequence of the communication apparatus 301 and the access points A and B according to the present exemplary embodiment. FIG. 5 illustrates a case where the communication apparatus 301 receives a communication parameter from the access point A that operates as a providing apparatus.

When the user operates the setting button 106 of the communication apparatus 301, the communication apparatus 301 starts the process illustrated in FIG. 4. At this point in time, since the information about the nearby access points is not stored in the storage unit 103 (NO in step S401), the communication apparatus 301 transmits a probe request to obtain a nearby access point (F501 and step S402).

When the autoconfiguration processing at the access point A is started by the user, the access point A, as a providing apparatus, starts the communication parameter autoconfiguration processing. In response to the probe request sent from the communication apparatus 301, the access point A returns a probe response. Self information indicating that the access point A itself is an active access point is added to the probe response (F502). Further, in response to the probe request sent from the communication apparatus 301, the access point B returns a probe response. Self information indicating that the access point B itself is a setup-completed access point is added to the probe response (F502).

The communication apparatus 301 analyzes the received probe responses (S411 and YES in step S404) and selects the access point A, which is an active access point, as the access point to be connected (F503).

The communication apparatus 301 makes wireless connection to the access point A (F504, F505, and step S406). After the communication apparatus 301 is connected to the access point A, the communication apparatus 301 sends a request for a communication parameter to the access point A (F506) and receives the communication parameter from the access point A (F507, step S407, and YES in and S408).

In this way, the receiving apparatus can automatically select an active access point, make wireless connection, and receive the communication parameter without delay.

Next, an operation of the communication apparatus 301 when it receives a communication parameter from the external apparatus 304 via the access point B will be described.

FIG. 6 illustrates another example of a process sequence of the communication apparatus 301, the access point B, and the external apparatus 304 according to the present exemplary embodiment. To simplify the description, the access point A is considered as not operating in FIG. 6.

When the user operates the setting button 106 of the communication apparatus 301, the communication apparatus 301 starts the process illustrated in FIG. 4. At this point in time, since the information about the nearby access points is not stored in the storage unit 103 (NO in step S401), the communication apparatus 301 transmits a probe request to obtain a nearby access point (F601 and step S402).

The access point B returns a probe response in response to the probe request sent from the communication apparatus 301. Self information indicating that the access point B itself is a setup-completed access point is added to the probe response (F602).

The communication apparatus 301 analyzes the received probe response (step S411, NO in step S404, and YES in step S405) and selects the access point B, which is a setup-completed access point, as the access point to be connected (F603).

The communication apparatus 301 makes wireless connection to the access point B (F604, F605, and step S406). After the communication apparatus 301 is connected, the communication apparatus 301 sends a request for a communication parameter to the access point B (S407), and the access point B transfers the received request to the external apparatus 304 (F606).

At this point in time, since the external apparatus 304 has not started the communication parameter autoconfiguration processing as a providing apparatus, an error message will be sent in response to the received request (F607). However, by receiving the request, the external apparatus 304 recognizes the presence of the communication apparatus 301 that requests the reception of the communication parameter, and communication parameter autoconfiguration processing can be started.

If the user starts the autoconfiguration processing of the external apparatus 304 (F608), the external apparatus 304 starts the communication parameter autoconfiguration processing as a providing apparatus. When the autoconfiguration processing of the external apparatus 304 is started, the external apparatus 304 sends a message (start notification) to the access point B notifying that it has started operation as a providing apparatus (F609). If the access point B receives the probe request after it has received the start notification, the access point B includes information indicating that it is an active access point in the self information, which is added to the probe response and sends the information.

If the communication apparatus 301 receives an error message (NO in step S408), the communication apparatus 301 updates the information about the nearby access points so that the access point B is determined as an access point that has undergone the communication parameter autoconfiguration processing (step S410), and then the process returns to step S401. Then, the communication apparatus 301 checks again the information about the nearby access points that is stored (step S403). Since an unselected setup-completed access point does not exist in this case (NO in steps S404 and S405), information about the nearby access points is deleted (step S412), and the process returns to step S402.

Then, the communication apparatus 301 sends out a probe request to obtain a nearby access point again (F610 and step S402). In response to the probe request sent from the communication apparatus 301, the access point B returns a probe response (F611). Self information indicating that the access point B is an active access point is added to the probe response.

The communication apparatus 301 analyzes the received probe response (step S411 and YES in step S404) and selects the active access point B as the access point to be connected (F612).

The communication apparatus 301 wirelessly connects itself to the access point B (F613, F614, and step S406). After the wireless connection is made, the communication apparatus 301 sends a request for a communication parameter to the access point B (step S407), and the access point B transfers the received request to the external apparatus 304 (F615). At this point in time, since the external apparatus 304 has started the communication parameter autoconfiguration processing as a providing apparatus, the external apparatus 304 provides the communication apparatus 301 with a communication parameter (F616 and step S408).

In this way, the receiving apparatus automatically selects a setup-completed access point and makes wireless connection. Thus, the receiving apparatus can receive a communication parameter from the external providing apparatus.

Next, operation of the apparatuses when a plurality of setup-completed access points exist will be described.

FIG. 7 illustrates another example of the process sequence of the receiving apparatus, the access point A, the access point B, and the external apparatus 304 according to the present exemplary embodiment. A communication parameter that is different from the one set at the time of initialization is set to the access points A as well as B. Further, the access point A has not started the communication parameter autoconfiguration processing as a providing apparatus.

When the user operates the setting button 106 of the communication apparatus 301, the communication apparatus 301 starts the process illustrated in FIG. 4. At this point in time, since the information about the nearby access points is not stored in the storage unit 103 (NO in step S401), the communication apparatus 301 transmits a probe request to obtain a nearby access point (F701, step S402).

The access point A returns a probe response in response to the probe request sent from the communication apparatus 301. Self information indicating that the access point A is a setup-completed access point is added to the probe response (F702). The access point B also returns a probe response in response to the probe request sent from the communication apparatus 301. Self information indicating that the access point B is a setup-completed access point is added to the probe response (F702).

The communication apparatus 301 analyzes the received probe response (step S411 and NO in step S404) and detects the access points A and B, both of which are setup-completed access points (YES in step S405). Since a wireless LAN channel with a lower frequency is assigned to the access point A compared to the access point B, the communication apparatus 301 selects the access point A as the access point to be connected (F703).

Then, the communication apparatus 301 makes wireless connection to the access point A (F704, F705 and step S406). After the communication apparatus 301 is connected, the communication apparatus 301 sends a request for a communication parameter to the access point A (F706 and S407). Since the access point A has not started the communication parameter autoconfiguration processing as a providing apparatus, an error message will be sent to the communication apparatus 301 (F707).

When the communication apparatus 301 receives the error message (NO in step S408), the communication apparatus 301 updates the information about the nearby access points so that the access point A is determined as an access point that has undergone the communication parameter autoconfiguration processing (step S410), and then the process returns to step S401. The communication apparatus 301 analyzes the nearby access point information again (NO in step S404 and YES in step S405) and selects the access point B, which is a setup-completed access point, as the access point to be wirelessly connected (F708).

The communication apparatus 301 makes wireless connection to the access point B (F709, F710, and step S406) After the communication apparatus 301 is connected, the communication apparatus 301 sends a request for a communication parameter to the access point B (S407), and the access point B transfers the received request to the external apparatus 304 (F711).

At this point in time, since the external apparatus 304 has not started the communication parameter autoconfiguration processing as a providing apparatus, an error message will be sent in response to the received request (F712). However, by receiving the request, the external apparatus 304 recognizes the presence of the communication apparatus 301 that requests the reception of the communication parameter, and communication parameter autoconfiguration processing can be started.

Thus, if the user starts operation of the autoconfiguration processing of the external apparatus 304 (F713), the external apparatus 304 starts the communication parameter autoconfiguration processing as a providing apparatus. When the autoconfiguration processing of the external apparatus 304 is started, the external apparatus 304 sends a message (start notification) to the access point B notifying that it has started operation as a providing apparatus (F714). If the access point B receives the probe request after it has received the start notification, the access point B includes information indicating that it is an active access point in the self information, which is added to the probe response, and sends the information.

If the communication apparatus 301 receives an error message (NO in step S408), the communication apparatus 301 updates the information about the nearby access points so that the access point B is determined as an access point that has undergone the communication parameter autoconfiguration processing (step S410), and then the process returns to step S401.

Then, the communication apparatus 301 checks again the information about the nearby access points that is stored (step S403). Since an unselected setup-completed access point does not exist in this case (NO in steps S404 and S405), information about the nearby access points is deleted (step S412), and the process returns to step S402.

Then, the communication apparatus 301 sends out a probe request to obtain a nearby access point again (F715 and step S402). In response to the probe request sent from the communication apparatus 301, the access point A returns a probe response (F716). Self information indicating that the access point A is a setup-completed access point is added to the probe response. In response to the probe request sent from the communication apparatus 301, the access point B returns a probe response (F716). Self information indicating that the access point B is an active access point is added to the probe response.

The communication apparatus 301 analyzes the received probe response (step S411 and YES in step S404) and selects the active access point B as the access point to be connected (F717).

The communication apparatus 301 wirelessly connects itself to the access point B (F718, F719, and step S406). After the connection is made, the communication apparatus 301 sends a request for a communication parameter to the access point B (step S407), and the access point B transfers the received request to the external apparatus 304 (F720). At this point in time, since the external apparatus 304 has started the communication parameter autoconfiguration processing as a providing apparatus, the external apparatus 304 provides the communication apparatus 301 with a communication parameter (F721 and YES in step S408).

In this way, the receiving apparatus automatically selects an access point even if there are a plurality of setup-completed access points and makes wireless connection. Thus, the receiving apparatus can receive a communication parameter from the external providing apparatus.

As described above, according to the present exemplary embodiment, an apparatus that requests reception of a communication parameter automatically selects an access point to be connected and performs autoconfiguration protocol processing. This eliminates the need for manual selection of the access point when the user makes wireless connection and receives the communication parameter from the providing apparatus. Further, if both an active access point and a setup-completed access point are detected, the active access point is given priority since the active access point has higher possibility of successfully receiving the communication parameter. Accordingly, time until the communication parameter is received can be reduced. Further, similar processing can be used in receiving the communication parameter both when the access point itself operates as a providing apparatus and when the external apparatus that communicates with an access point operates as a providing apparatus.

Further, in the access point search processing in step S402, the receiving apparatus waits until a probe response is returned from the access point (i.e., active scanning). Additionally, since the access point transmits a beacon signal, including self information, at regular intervals, the receiving apparatus can check for the beacon signal for a certain period of time in searching for the access point (i.e., passive scanning). Further, both of the active scanning and the passive scanning can be simultaneously used for the search of the access point.

Additionally, in steps S404 and S405, an access point to which a wireless LAN channel with the lowest frequency is assigned, is selected if a plurality of active access points or setup-completed access points are detected.

However, as a selection method of the access point, an access point to which a wireless LAN channel with the highest frequency is assigned, can also be selected, or the selection can be based on a different type of information. For example, the access point can be selected according to reception signal strength, SSID, BSSID (Basic Service Set Identifier), or MAC address of access point.

According to the processing of the first exemplary embodiment illustrated in FIG. 4, the receiving apparatus starts the search for an access point from the nearby access points. If a plurality of setup-completed access points are detected, one out of the detected access points is selected as the connection target, and a request for communication parameter is transmitted. If an error message is returned from the selected access point in response to the request, a different setup-completed access point will be connected, and a request for a communication parameter is transmitted again. This process is repeated until a communication parameter is received. If an error message is sent from each of the detected setup-completed access point, in other words, if all of the detected access points are selected, an access point is searched again from the nearby access points.

As described above, some of the external providing apparatuses that are connected to a setup-completed access point can start the communication parameter autoconfiguration processing when it receives a request for a communication parameter. Even if the reception of a communication parameter by the external providing apparatus triggers the autoconfiguration processing, and the setup-completed access point is changed to an active access point, it is not reconnected to the access point until the search is performed again. Thus, although an external providing apparatus that has undergone the communication parameter autoconfiguration processing already exists, it may take a long time in completing the reception of the communication parameter. Further, a similar problem may occur when the access point itself operates as a providing apparatus if the receiving apparatus starts the communication parameter autoconfiguration processing before the access point.

According to the second exemplary embodiment, even if the communication parameter autoconfiguration processing of the providing apparatus is started after the receiving apparatus, time to the reception of the communication parameter can be reduced.

The apparatus configuration and the network configuration according to the second exemplary embodiment are similar to those of the first exemplary embodiment.

FIG. 8 is a flowchart illustrating an operation of the receiving apparatus according to the present exemplary embodiment. The process in FIG. 8 starts when the setting button 106 of the communication apparatus 301 is operated.

In step S801, the autoconfiguration control unit 208 searches for a nearby access point using the search signal transmission unit 205 and the search signal reception unit 206.

In step S802, the active access point detection unit 210 analyzes the self information of each access point included in the result of the search obtained in step S801 and detects an active access point.

If the active access point is not detected (NO in step S802), then the process proceeds to step S803. If the active access point is detected (YES in step S802), the access point selection unit 212 selects the detected access point as an access point to be connected, and the process proceeds to step S807. If a plurality of active access points is detected according to the result of the analysis, the access point selection unit 212 selects an access point to which a wireless LAN channel with the lowest frequency is assigned.

In step S803, the autoconfiguration control unit 208 checks whether the information about the nearby access points is stored in the storage unit 103. If the information about the nearby access points is stored (YES in step S803), then the process proceeds to step S804. In step S804, the information about the nearby access points is updated based on the result obtained in step S801. In step S803, if the information about the nearby access points is not stored (NO in step S803), then the process proceeds to step S812. In step S812, the autoconfiguration control unit 208 stores the result of the search obtained in step S801, as the information about the nearby access points, in the storage unit 103. Then, the process proceeds to step 805.

In step S805, the setup-completed access point detection unit 211 detects the setup-completed access point by analyzing the self information of each access point included in the information about the nearby access points. According to the present exemplary embodiment, the setup-completed access point detection unit 211 excludes from the detection target an access point that has undergone the communication parameter autoconfiguration processing that is performed between the communication apparatus 301, out of the access points included in the information about the nearby access points. In this way, an access point that has once undergone the configuration processing, more specifically, a setup-completed access point that has encountered an error during the protocol processing for autoconfiguration is not selected again.

If the setup-completed access point is not detected (NO in step S805), then the process proceeds to step S806. In step S806, the autoconfiguration control unit 208 deletes the information about the nearby access points that is stored and the process returns to step S801. If the setup-completed access point is detected (YES in step S805), then the access point selection unit 212 selects the detected access point as the access point to be connected, and the process proceeds to step S807. If a plurality of setup-completed access points is detected, the access point selection unit 212 selects a setup-completed access point to which a wireless LAN channel with the lowest frequency is assigned.

In step S807, the network control unit 207 makes wireless connection to the selected access point. In step S808, after the wireless connection is made, the autoconfiguration control unit 208 executes the protocol processing for the autoconfiguration of the communication parameter.

In step S809, the autoconfiguration control unit 208 checks whether the communication parameter autoconfiguration protocol processing in step S808 has been successful. If the autoconfiguration protocol processing has been successfully executed and the communication parameter reception unit 209 has successfully received the communication parameter (YES in step S809), then the process proceeds to step S810. In step S810, the autoconfiguration control unit 208 deletes the information about the nearby access points stored in the storage unit 103 and the process ends.

In step S809, if the autoconfiguration protocol processing has been unsuccessful (NO in step S809), then the process proceeds to step S811. In step S811, the autoconfiguration control unit 208 updates the information about the nearby access points so that the access point that has undergone the autoconfiguration protocol processing in step S808 can be set as a communication parameter autoconfiguration-processed access point. After the information is updated, the process returns to step S801. As described above, the autoconfiguration processing of the access point or the external providing apparatus connected to the access point is not started when the autoconfiguration protocol processing in step S808 is started. Thus, in such a case, the autoconfiguration protocol processing may end due to an occurrence of an error.

However, after receiving the message of the autoconfiguration protocol processing, the access point as a providing apparatus starts the communication parameter autoconfiguration processing and thus can be changed to an active access point. Further, the reception of a message of a communication parameter by the external providing apparatus may trigger the start of the communication parameter autoconfiguration processing, and thus the access point can be changed to an active access point.

Thus, if the autoconfiguration protocol processing ends due to an error, an access point is searched again and the access point that has been changed to an active access point can be detected without delay. Accordingly, the autoconfiguration protocol processing can be performed again. When the access point is searched again, the search of the access point can be performed in a predetermined time after the receiving apparatus receives the error message considering the time that is necessary in completing the autoconfiguration processing of the external providing apparatus and the transmission time necessary in sending the start notification to the access point.

FIG. 9 illustrates an example of a process sequence of the communication apparatus 301 and the access points A and B according to the present exemplary embodiment. FIG. 9 illustrates a case where the communication apparatus 301 receives a communication parameter from the access point A. In FIG. 9, a communication parameter different from the one set at the time of initialization is set to the access point A. Further, the communication parameter autoconfiguration processing is not started at the access point A.

When the user operates the setting button 106 of the communication apparatus 301, the communication apparatus 301 starts the process illustrated in FIG. 8. First, since the information about the nearby access points is not stored in the storage unit 103, the communication apparatus 301 transmits a probe request to obtain a nearby access point (F901, step S801).

In response to the probe request sent from the communication apparatus 301, the access point A returns a probe response. Self information indicating that the access point A itself is a setup-completed access point is added to the probe response (F902). Further, self information indicating that the access point B itself is also a setup-completed access point is added to the probe response (902).

The communication apparatus 301 analyzes the received probe response (NO in steps S802 and S803, and step S812)

and detects the access points A and B, both of which are setup-completed access points (YES in step S805). Since the access point A uses a wireless LAN channel with a lower frequency than that used by the access point B, the communication apparatus 301 selects the access point A as the access point to be connected (F903).

The communication apparatus 301 makes wireless connection to the access point A (F904, F905, and step S807). After the communication apparatus 301 is connected to the access point A, the communication apparatus 301 sends a request for a communication parameter to the access point A (F906 and step S808). At this point in time, since the communication parameter autoconfiguration processing of the access point A as a providing apparatus is not started, an error notification is sent to the communication apparatus 301 (F907).

When the autoconfiguration processing at the access point A is started by the user (F908), the access point A as a providing apparatus starts the communication parameter autoconfiguration processing.

If the communication apparatus 301 receives an error message (NO in step S809), the communication apparatus 301 updates the information about the nearby access points so that the access point A is determined as an access point that has undergone the communication parameter autoconfiguration processing (step S811), and then the process returns to step S801. Then, the communication apparatus 301 sends a probe request to search for a nearby access point again (F909).

In response to the probe request sent from the communication apparatus 301, the access point A returns a probe response (F910). Self information indicating that the access point A is an active access point, is added to the probe response. Additionally, in response to the probe request sent from the communication apparatus 301, the access point B returns a probe response (F910). Self information indicating that the access point B is a setup-completed access point is added to the probe response.

The communication apparatus 301 analyzes the received probe response (YES in step S802) and selects the active access point A as the access point to be wirelessly connected (F911).

The communication apparatus 301 connects itself to the access point A (F912, F913, and step S807). After the communication apparatus 301 is connected, the communication apparatus 301 sends a request for a communication parameter to the access point A (F914 and step S808). At this point in time, since the communication parameter autoconfiguration processing of the access point A as a providing apparatus is started, the access point A provides the communication apparatus 301 with a communication parameter (F915 and YES in step S809).

According to the present exemplary embodiment, the access point is searched each time the communication parameter autoconfiguration protocol processing ends by an error. Thus, when the setup-completed access point is changed to an active access point, the change can be immediately detected. Thus, in addition to the effect of the first exemplary embodiment, the receiving apparatus can receive the communication parameter from the providing apparatus without delay even if the communication parameter autoconfiguration processing is started by the providing apparatus after the receiving apparatus.

In the access point search processing in step S801, the receiving apparatus waits until a probe response is returned from the access point (i.e., active scanning). Additionally, since the access point transmits a beacon signal, including self information, at regular intervals, the receiving apparatus can check for the beacon signal for a fixed time in searching for the access point (i.e., passive scanning). Further, both of the active scanning and the passive scanning can be simultaneously used for the search of the access point.

Further, in steps S802 and S805, if a plurality of active access points or setup-completed access points is detected, a access point to which a wireless LAN channel with the lowest frequency is assigned, is selected. However, as a selection method of the access point, an access point to which a wireless LAN channel with the highest frequency is assigned can also be selected, or the selection can be based on a different type of information. For example, the access point can be selected according to reception signal strength, SSID, BSSID (Basic Service Set Identifier), or MAC address of access point.

The aforementioned exemplary embodiments are described based on a wireless LAN conforming to the IEEE 802.11 standards. However, a different type of wireless medium offered by wireless USB, MBOA, Bluetooth (registered trademark), UWB (ultra wide band), and ZigBee can also be used in the present invention. Further, wired communication medium such as wired LAN may also be used.

MBOA stands for Multi Band OFDM Alliance and UWB includes wireless USB, wireless 1394, and WINET.

Additionally, in the exemplary embodiments, a network identifier, a cryptographic method, an encryption key, an authentication method, or an authentication key is used as the example of the communication parameter. However, other information can also be used. Further, other information can also be included in the communication parameters.

The present invention can also be achieved by supplying a recording medium for recording a computer-executable program code which is configured to realize a function of the above-described exemplary embodiments, to a system or an apparatus and reading out and executing the program code stored in the recording medium by a computer (or CPU or MPU) of the system or the apparatus. In this case, the program code read out from the recording medium itself realizes the functions of the above-described exemplary embodiments and the program code and the recording medium which stores the program code also falls within the scope of the present invention.

A recording medium for storing the program code includes, for example, a floppy disk, a hard disk, an optical disk, a magneto-optical disc, a compact disc read-only memory (CD-ROM), a compact disc-recordable (CD-R), a magnetic tape, a non-volatile memory card, a read-only memory (ROM), and a digital versatile disc (DVD).

A function of the above-described exemplary embodiments is realized not only when the computer executes the program code. For example, an operating system (OS) which runs on a computer can execute a part or whole of the actual processing based on an instruction of the program code so that the function of the above-described exemplary embodiments can be achieved.

Further, a program code read out from a recording medium can be written in a memory provided in a function expansion board of a computer or a function expansion unit connected to the computer. Based on an instruction of the program code, the CPU of the function expansion board or a function expansion unit can execute a part or all of the actual processing. The functions of the aforementioned exemplary embodiments can be realized in this manner.

According to the present exemplary embodiment, the communication apparatus automatically selects and connects an access point, and receives a communication parameter from the access point or an external apparatus that communicates with the access point. Thus, the load of the user when the user selects an access point can be reduced.

An embodiment of the present invention can provide a communication apparatus comprising: a search means configured to perform search processing for detecting a base station which can provide a communication parameter and a base station configured with a communication parameter different from a communication parameter set at a time of initialization; a selection means configured to select a base station which is connected such that the communication parameter can be received based on a result of the search executed by the search means; and a reception means configured to receive a communication parameter from the base station selected by the selection means or an external apparatus that communicates with the base station.

In such a communication apparatus the selection means selects the base station which can provide a communication parameter in preference to the base station configured with a communication parameter different from a communication parameter set at a time of initialization.

Preferably, if reception processing of a communication parameter by the reception means ends due to an error, the selection means newly selects the base station that is not yet selected, from the base stations detected as a result of the search processing.

Preferably, if reception processing of a communication parameter by the reception means ends due to an error and all base stations detected by the search processing are already selected, the search processing is performed again.

Preferably, if reception processing of a communication parameter by the reception means ends due to an error, the search processing is executed again to detect the base station which has been changed to the base station capable of providing the communication parameter.

Preferably, if the base station starts setting of a communication parameter as a providing apparatus configured to provide the communication parameter, or the external apparatus that communicates with the base station starts the setting of the communication parameter as the providing apparatus, the base station is detected as a result of the search processing as the base station which can provide the communication parameter.

Preferably, the search processing searches for a nearby base station by transmitting a search signal used for searching for the base station and waits for a response signal responding to the search signal, and detects the base station which can provide the communication parameter and the base station configured with a communication parameter different from a communication parameter set at a time of initialization, based on information added to the response signal.

Preferably, the search processing is processing for searching for a nearby base station by monitoring a notification signal transmitted from the base station, and the base station which can provide the communication parameter and the base station configured with a communication parameter different from a communication parameter set at the time of initialization are detected, based on information added to the notification signal.

Another embodiment of the invention can provide a control method of a communication apparatus comprising: performing search processing for detecting a base station which can provide a communication parameter and a base station configured with a communication parameter different from a communication parameter set at a time of initialization; selecting a base station to be connected based on the search result; and connecting to the selected base station and receiving a communication parameter from the base station or an external apparatus that communicates with the base station.

Another embodiment of the present invention can provide a computer-executable program configured to cause a computer to execute the abovementioned control method.

A further embodiment of the invention can provide a storage medium storing a computer-executable program configured to cause a computer to execute the abovementioned control method.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-219986 filed Aug. 28, 2008, which is hereby incorporated by reference herein in its entirety.

What is claimed is:

1. A communication apparatus comprising: a search unit configured to perform search processing for detecting a base station which can provide a communication parameter and a base station configured with a communication parameter different from a communication parameter set at a time of initialization; a selection unit configured to select a base station which is to be connected such that the communication parameter can be received, based on a result of the search executed by the search unit; and a reception unit configured to receive a communication parameter from the base station selected by the selection unit or from an external apparatus that communicates with the base station; and wherein the selection unit selects the base station which can provide a communication parameter in preference to the base station configured with a communication parameter different from a communication parameter set at the time of initialization.

2. The communication apparatus according to claim 1, wherein if reception processing of a communication parameter by the reception unit ends due to an error, the selection unit selects the base station that has not been selected, from the base stations detected as a result of the search processing.

3. The communication apparatus according to claim 1, wherein if reception processing of a communication parameter by the reception unit ends due to an error and all base stations detected by the search processing are already selected, the search unit is configured to perform the search processing again.

4. The communication apparatus according to claim 1, wherein if reception processing of a communication parameter by the reception unit ends due to an error, the search unit is configured to perform the search processing again to detect the base station which has been changed to the base station capable of providing a communication parameter.

5. The communication apparatus according to claim 1, wherein if the base station starts setting of a communication parameter corresponding to a providing apparatus configured to provide a communication parameter, or if the external apparatus that communicates with the base station starts setting of a communication parameter corresponding to a providing apparatus configured to provide a communication parameter, the search unit is configured to detect the base station as a result of the search processing of the base station which can provide a communication parameter.

6. The communication apparatus according to claim 1, wherein the search unit is configured: to perform the search processing for searching for a nearby base station by transmitting a search signal used for searching for the base station, to wait for a response signal responding to the search signal, and to detect the base station which can provide a communication parameter and the base station configured with a communication parameter different from a communication parameter set at the time of initialization, based on information added to the response signal.

7. The communication apparatus according to claim 1, wherein the search unit is configured: to perform the search processing for searching for a nearby base station by monitoring a notification signal transmitted from the base station, and to detect the base station which can provide a communication parameter and the base station configured with a communication parameter different from a communication parameter set at the time of initialization are detected, based on information added to the notification signal.

8. A control method of a communication apparatus comprising: performing search processing for detecting a base station which can provide a communication parameter and a base station configured with a communication parameter different from a communication parameter set at a time of initialization; selecting a base station to be connected based on the search result; and connecting to the selected base station and receiving a communication parameter from the base station or an external apparatus that communicates with the base station; and wherein a selection unit selects the base station which can provide a communication parameter in preference to the base station configured with a communication parameter different from a communication parameter set at the time of initialization.

9. A Non-transitory computer-readable storage medium storing computer executable instructions which, when run on a computer, cause said computer to execute a control method, the instructions comprise: instructions to perform search processing for detecting a base station which can provide a communication parameter and a base station configured with a communication parameter different from a communication parameter set at a time of initialization; instruction to select a base station to be connected based on the search result; and instructions to connect to the selected base station; and instructions to receive the a communication parameter from the base station or an external apparatus that communicates with the base station; and wherein a selection unit selects the base station which can provide a communication parameter in preference to the base station configured with a communication parameter different from a communication parameter set at the time of initialization.

* * * * *